May 22, 1928.　　　G. LA R. HAMILTON　　　1,670,350
LORGNETTE
Filed April 5, 1927
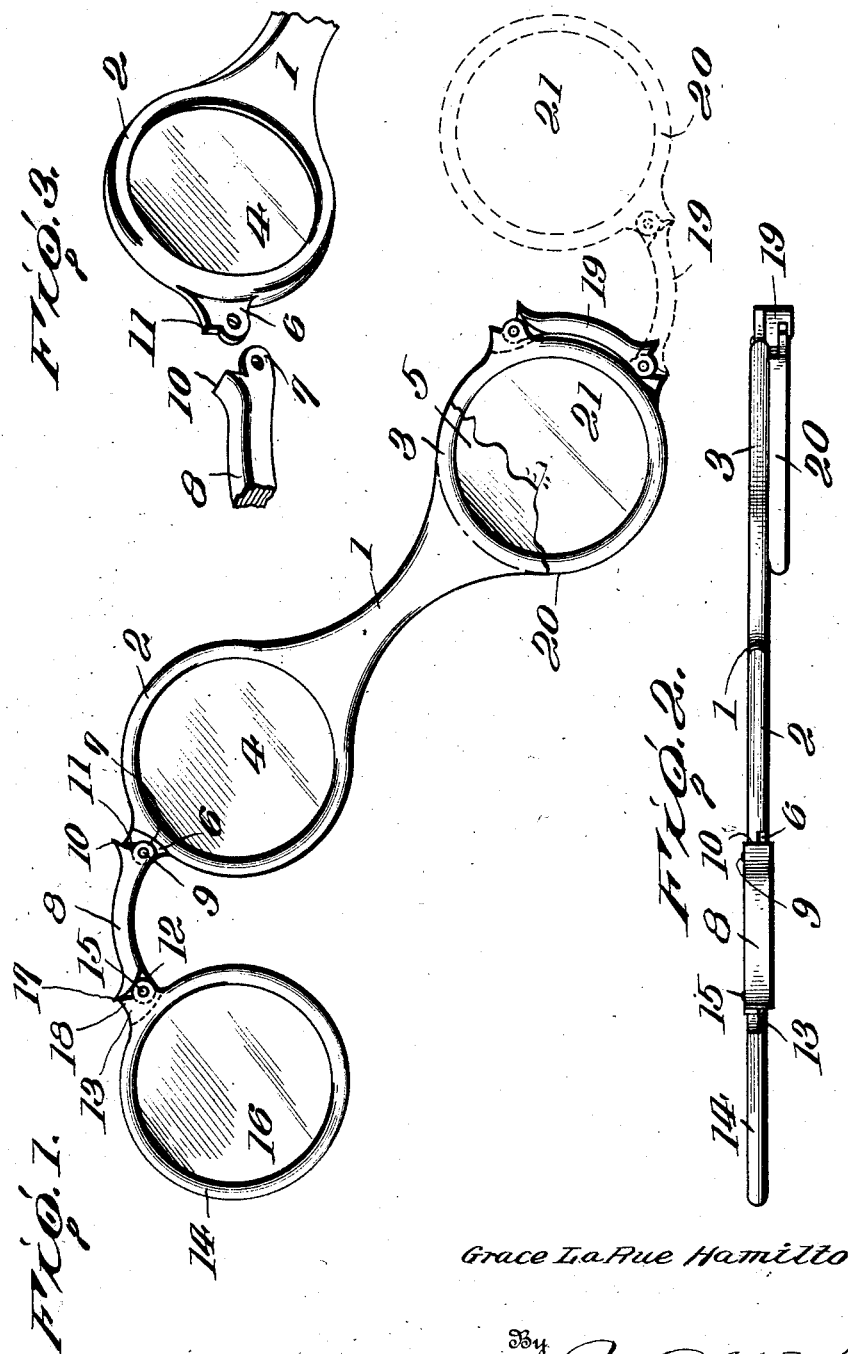
Inventor
Grace LaRue Hamilton,
By
Attorney Patented May 22, 1928.

1,670,350

UNITED STATES PATENT OFFICE.

GRACE LA RUE HAMILTON, OF NEW YORK, N. Y.

LORGNETTE.

Application filed April 5, 1927. Serial No. 181,087.

This invention relates to certain new and useful improvements in lorgnettes, the object being to provide a duplex lorgnette wherein a pair of reading lenses and a pair of distance lenses are employed, the lorgnette being so constructed that either pair of lenses can be used.

Another object of my invention is to provide a lorgnette in which a main frame is employed having a rim at each end, one rim carrying a reading lens and the other a distance lens, each rim having a bridge piece pivotally connected thereto carrying a rim with a lens corresponding to the lens of the frame, the bridge pieces and rim being foldable so that when one set of lenses is in use, the other pair of lenses are folded one upon the other.

Another object of my invention is to provide a lorgnette which is exceedingly simple and cheap in construction and one in which the members are pivotally connected together so that they can be folded one upon another so as to occupy a very small space.

Other and further objects and advantages of the invention will be hereinafter set forth and the novel features thereof defined by the appended claims.

In the drawings,

Figure 1 is a plan view of a lorgnette constructed in accordance with my invention;

Figure 2 is an edge view of the same; and

Figure 3 is a detail perspective view of one of the rims of the main frame showing the manner of connecting the bridge piece thereto.

In carrying out my invention I employ a frame comprising a central handle portion 1 which terminates at one end in a rim 2 and at the other end in a rim 3, the rim 2 being adapted to contain a reading lens 4 and the rim 3 a distance lens 5.

The rim 2 is provided with an apertured lug 6 to which is pivotally connected the reduced apertured end 7 of a bridge piece 8 by a pivot 9, the bridge piece being provided with a shoulder 10 which is adapted to engage a shoulder 11 formed on the lug 6 in order to form a stop for limiting the movement of the bridge piece.

The opposite end of the bridge piece 8 is provided with a reduced apertured portion 12 to which is pivotally connected an apertured lug 13 of a rim 14 by a pivot 15, the rim 14 being adapted to contain a reading lens 16. The reduced end of the bridge piece is provided with a shoulder 17 adapted to engage a shoulder 18 formed on the lug 13 of the rim 14 so as to limit the movement of the rim in respect to the bridge piece in order to hold the movable rim in the position shown in Figure 1 so that the handle 1 can be grasped by the user in order to hold the lenses 4 and 16 in position on the nose of the user.

By connecting the bridge piece 8 to the rim 2 and the rim 14 to the bridge piece in the manner specified, the same can be folded so as to place the lenses 4 and 16 over one another.

The rim 3 has pivotally connected thereto a bridge piece 19, to the free end of which is pivotally connected a rim 20 in which is disposed a distance lens 21, the construction and manner of connecting the bridge piece to the rim 3 and the rim 20 to the bridge piece is identical as described in connection with the bridge piece 8 and rim 14, the rims being provided with lugs and shoulders to which the bridge piece 19 is pivotally connected respectively so as to allow the rim 20 to be folded into the position shown in Figure 1 over the lens 5 in which position the reading lenses are in position to be used.

By folding the rim 14 over the rim 2 and moving the rim 20 and bridge piece 19 in position as shown by dotted lines in Figure 1, the distance lenses are moved into position to be used by reversing the same.

From the foregoing description it will be seen that I have provided a duplex lorgnette in which a main frame comprising a central handle portion is employed having a rim at each end, one rim carrying a reading lens and the other a distance lens, each rim having pivotally connected thereto a bridge piece carrying a rim provided with a less corresponding to the lens to which it is connected so that either pair of lenses can be used and when one pair of lenses is moved into position to be used, the other lenses overlie one another so as to allow the handle portion of the main frame to be grasped in order to hold the proper lenses in position to be used.

What I claim is:—

1. A lorgnette comprising a frame having a handle portion terminating in a rim portion at each end, one rim carrying a distance lens and the other a reading lens and a bridge piece pivotally connected to each of said rims, each bridge piece carrying a rim provided with a lens corresponding to the lens to which the bridge piece is connected.

2. A lorgnette comprising a main frame terminating at each end in a rim portion adapted to receive a lens, a bridge piece carried by each rim having a rim connected thereto.

3. A lorgnette comprising a main frame having a handle portion terminating at each end in a rim portion, a bridge piece pivotally connected to each rim and a rim pivotally connected to each bridge piece, one pair of rim portions carrying reading lenses and the other pair carrying distance lenses.

4. A lorgnette comprising a frame composed of a central handle portion terminating at each end in a rim portion, each rim portion being provided with an apertured lug having a shoulder, a bridge piece provided with a shoulder pivotally connected to said apertured lug, the free end of said bridge piece being reduced and a rim having an apertured lug pivotally connected to the reduced end of each bridge piece provided with a shoulder for limiting the movement thereof.

5. A lorgnette comprising a frame composed of a central handle portion terminating at each end in a rim, each rim being adapted to contain a lens, a bridge piece pivotally connected to each rim, each bridge piece having a rim pivotally connected to its free end capable of being folded into position to be used and in position to overlie the adjacent rim portion of the main frame.

6. A lorgnette comprising a frame terminating in a rim portion at each end, each rim portion carrying a pivoted bridge piece, each bridge piece carrying a pivoted rim and means for limiting the pivotal movement of said bridge pieces and said pivoted rims.

7. A lorgnette comprising a frame terminating in a rim portion at each end, one rim portion containing a reading lens and the other a distance lens, a bridge piece pivotally connected to each of said rim portions, a rim pivotally connected to each bridge piece, one of said rims being provided with a reading lens and the other with a distance lens, said pivoted rim portions and bridge pieces being capable of being moved into position and placed over the nose of the user or folded to overlie the corresponding lens of the rims.

In testimony whereof I hereunto affix my signature.

GRACE LA RUE HAMILTON.